United States Patent [19]
Warkentin

[11] Patent Number: 4,911,726
[45] Date of Patent: Mar. 27, 1990

[54] FASTENER/RETAINING RING ASSEMBLY
[75] Inventor: Roy L. Warkentin, Lomita, Calif.
[73] Assignee: Rexnord Holdings Inc., Torrance, Calif.
[21] Appl. No.: 243,809
[22] Filed: Sep. 13, 1988
[51] Int. Cl.$^4$ .................. B25B 13/06; F16B 21/00
[52] U.S. Cl. .................. 81/124.2; 81/176.15; 411/337; 411/424; 411/353; 411/999
[58] Field of Search ............ 411/337, 349, 553, 554, 411/549, 555, 353, 352, 424, 107, 108, 999; 81/124.2, 176.15, 176.2

[56] References Cited
U.S. PATENT DOCUMENTS

| 707,785 | 8/1902 | Kleber | 411/349 |
|---|---|---|---|
| 2,400,166 | 5/1946 | Reece | 81/124.2 |
| 2,451,747 | 6/1946 | Kindt | 81/176.2 |
| 3,294,140 | 12/1966 | Cosenza | 411/999 |
| 3,995,675 | 12/1976 | Cosenza | 411/353 |
| 4,069,855 | 1/1978 | Petroshanoff | 411/999 |
| 4,464,090 | 8/1984 | Duran | 411/353 |
| 4,854,795 | 8/1989 | Duran | 411/352 |

OTHER PUBLICATIONS
Tridair Stud Bolt Part No. CA21037, 1980.

Primary Examiner—Gary L. Smith
Assistant Examiner—F. Saether
Attorney, Agent, or Firm—Pretty, Schroeder, Brueggemann & Clark

[57] ABSTRACT

An elongated, generally cylindrical fastener engagable with a retaining ring to secure the fastener to a panel. The fastener includes a first set of uniformly-spaced splines extending along its external surface and terminating at an end of the fastener opposite an enlarged head. A second set of longitudinal splines is interleaved with the first set, these second splines being closed at their opposite ends. A separate crossover slot connects together each associated pair of open-end and closed-end splines. A retaining ring having inwardly-projecting tabs is slid onto the fastener with its tabs engaging the first set of open-end splines and the retaining ring is thereafter rotated to slide the tabs across the crossover slots to the closed-end splines. The depth of the crossover slots is less than the depth of the closed-end splines, such that the retaining ring must expand or flex outwardly when the tabs are slid across the slots. A special insertion tool used to secure the retaining ring in place has a general cylindrical shape and an opening in one end for receiving the fastener. The end of the tool is notched to engage the retaining ring tabs, and the tool wall is sufficiently thin to fit between the fastener and the retaining ring.

13 Claims, 2 Drawing Sheets

FASTENER/RETAINING RING ASSEMBLY

BACKGROUND OF THE INVENTION

The present invention relates generally to panel fasteners, and, more particularly, to panel fasteners adapted to receive a retaining rig.

Many panel fasteners take the form of elongated, cylindrical shafts having external or internal threads for engaging a complimentarily-threaded nut or screw and further having an enlarged head at one end to engage or retain a panel. A common bolt is an example of a fastener.

In a variety of applications, it is advantageous to arrange for the fastener to be retained in relation to the panel. One common approach is to insert the fastener through a hole in the panel and then attach a retaining ring to the fastener's threaded end. The retaining ring prevents the fastener from being extracted, yet still permits a nut to be threaded onto the fastener to secure the panel. The fastener is far less likely to be lost during disassembly and reassembly procedures.

A number of different approaches have been developed for attaching a retaining ring to a fastener. One approach involves forming a plurality of grooves or splines along the length of the fastener to receive inwardly-projecting tabs of the retaining ring. The splines extend fully to the end of the fastener opposite the head. After the retaining ring has been slid onto the fastener, an end cap is attached to the threaded end of the fastener, to close off the channels and prevent the ring from being removed. One disadvantage to this approach is that it cannot be easily or economically applied to hollow, internally threaded fasteners.

In another approach, splines are again formed along the length of the fastener, and a second set of splines is also formed along the fastener, interleaved with the first set. Both ends of each spline in the second set are closed off, so that a retaining ring cannot be longitudinally removed from the fastener when the retaining rings inwardly-directed tabs engage the second set of splines. Crossover slots individually connect the first set of open-end splines with the second set of closed splines. The retaining ring secured to the fastener by sliding its tabs along the open-end slots to the location of the crossover slots, and by then rotating the retaining ring so as to move the tabs over to the closed splines. Extraction of the fastener from the workpiece is prevented as long as the retaining ring tabs do not exit back through the crossover slots and open-end splines.

Although this approach is suitable for internally threaded fasteners, it is nevertheless subject to certain drawbacks. Fastener movement during disassembly procedures sometimes leads to rotation of the retaining ring with respect to the fastener. This rotation can occasionally reposition the retaining ring tabs in the open-end splines, thus permitting inadvertent release of the retaining ring from the fastener. In order to overcome this disadvantage, the cross-over slots are sometimes displaced longitudinally relative to each other so that the ring tabs can be moved from the closed splines to the open-end splines only when the ring is tilted at an extreme angle relative to the fastener shaft. While the likelihood of an inadvertent fastener release is reduced using this latter approach, inadvertent release through random movement of the fastener can still occur.

It should therefore be appreciated that there is a need for a fastener retaining ring combination that does not rely on the orientation of the fastener with respect to a retaining ring to keep the ring attached to the fastener, but that still is suitable for fasteners of both external and internal thread configurations. The present invention fulfills this need.

SUMMARY OF THE INVENTION

The present invention is embodied in a fastener having a generally cylindrical shaft with a first spline extending longitudinally along the length of the shaft and terminating at one end of the shaft, with a second spline extending along the shaft, circumstantially spaced from the first spline and being closed at its opposite ends, and further with a slot interconnected with the first and second splines, the crossover slot having a depth less than the depth of the second, closed-end spline. The fastener shaft is sized to slidably receive a retaining ring having an inwardly-projecting tab that is engagable with the first and second splines and the crossover slot. The shallow depth of the crossover slot requires the retaining ring to significantly expand or flex outwardly to allow the inwardly-projecting tab to move from the first, open-end spline to the second, closed spline. The retaining ring thus resists displacement of the tabs between the two splines regardless of the relative orientation of the ring and shaft. The use of a closed-end spline on the shaft's exterior surface obviate the need for an end cap, thereby making the present invention suitable for use with hollow, internally-threaded fasteners.

In another aspect of the invention, the crossover slot's depth varies, thus forming a ramp leading from the first, open-end spline to tee second closed-end spline. This ramp facilitates insertion of the retaining ring tab into the closed-end spline, but does not ease the ring's resistance to displacement of the tabs from the closed-end spline back into the open-end spline The ramp may be smooth with a continuously varying depth, or may be formed by two straight segments, or may be formed by a straight line segment and a contiguous curved segment of constant depth.

Another aspect of the present invention is embodied in an insertion tool for affixing the retaining ring to the fastener. The tool is operable to move the ring tab from the open-end spline to the closed-end spline. The tool comprises a generally cylindrical tube having an opening in one end for receiving the fastener shaft. A notch is formed in the end of the tool, to engage the retaining ring tab. The tool wall is sufficiently thin to slide between the shaft's exterior surface and the retaining ring's interior surface. In use, the retaining ring is placed on the end of the tool, ring tab projecting into the tool notch, and the ring is then slid over the fastener shaft with the tab projecting into the open-end spline. The tool may then be rotated, to slide the ring tab across the crossover slot to the closed-end spline, to snap the ring in place.

The novel features that are believed to be characteristic to the present invention will be better understood from the following description of the preferred embodiments, considered in connection with the accompanying drawings, in which like numbers designate like elements It should be expressly understood, however, that the drawings are only for purposes of illustration and description and are not intended as a definition of the limits of the present invention.

Figure 9:
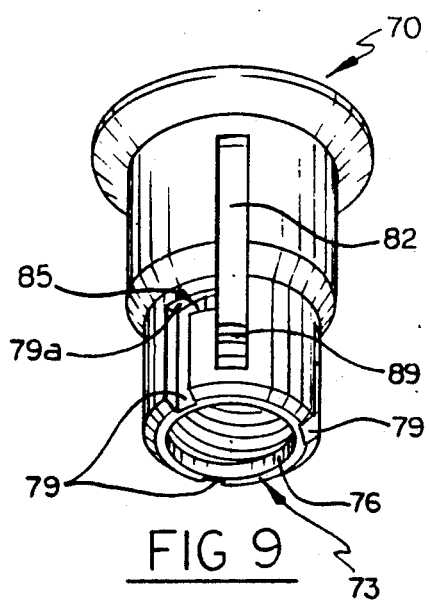
FIG. 9 is a perspective view of a third embodiment of a fastener in accordance with the present invention.

10 is a perspective view of a retaining ring that can be used with the fastener of FIG. 9.

Figure 10:
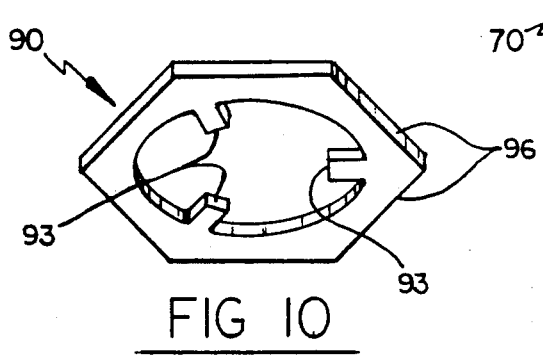
Figure 11:
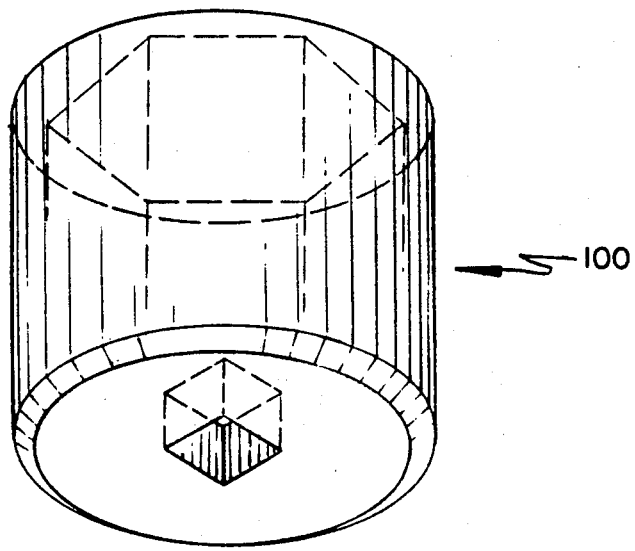

FIG. 11 is a perspective view of an insertion tool that can be used to secure the retaining ring of FIG. 10 to the fastener of FIG. 9.

Figure 12:
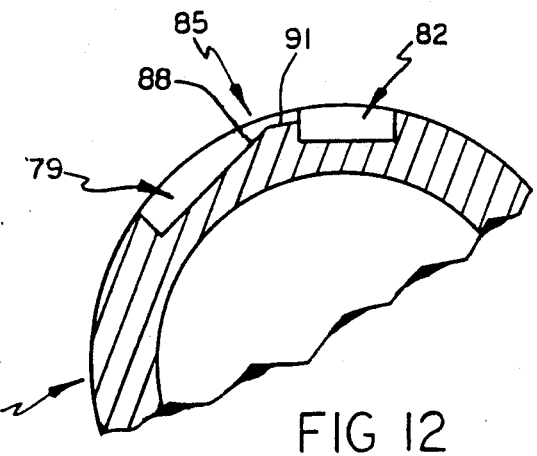

FIG. 12 is an oversized, fragmentary end sectional view of the fastener illustrated in FIG. 9.

DESCRIPTION OF THE PREFERRED EMBODIMENTS

Figure 3:
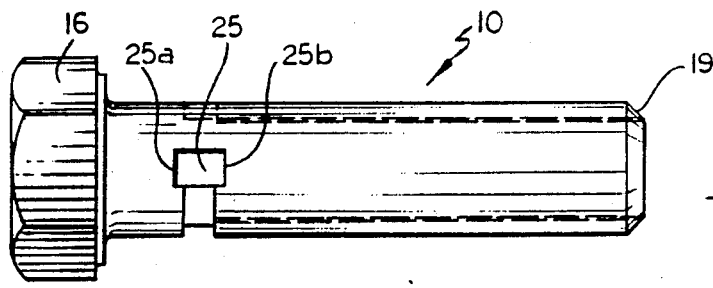
FIG. 3 is a side view of the fastener, taken from the top side of FIG.1.
Figure 1:
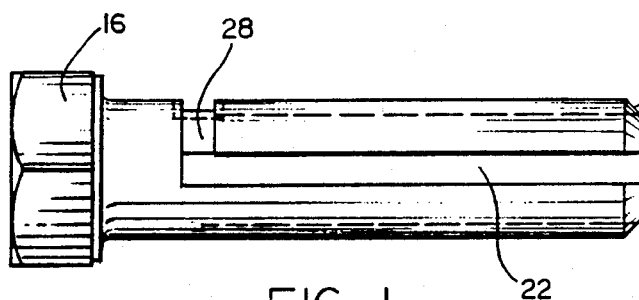
FIG. 1 is a side view of a first embodiment of a fastener in accordance with the present invention
Figure 2:
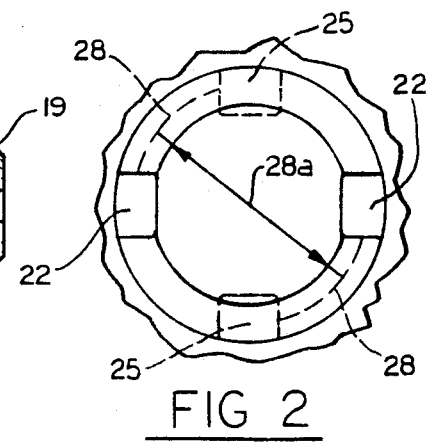
FIG. 2 is an oversized end view of the fastener, taken from the right side of FIG. 1.

Referring to the figures, and more particularly FIGS. 1-3, there is shown a first embodiment of a fastener 10 in accordance with the present invention. The fastener includes an elongated, externally-threaded shaft, with an enlarged head 16 at one end for engaging a panel (not shown) and a frusto-conical taper 19 at the opposite end. A first pair of splines 22 extend longitudinally along the shaft, opening into the frusto-conical tapered end, and a second pair of splines 25 is interleaved with the first pair. The second splines have closed ends 25a and 25b that do not extend to or open into the shaft's tapered end 19. A pair of crossover slots 28 interconnect each open spline 22 with a separate one of the closed splines 25.

Figure 7:
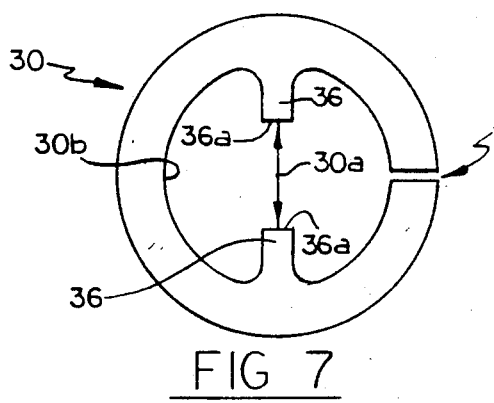
FIG. 7 is a plan view of a retaining ring that can be used with the fasteners of both FIG. 1 and FIG. 4.

To better understand the present invention and its unique advantages, an illustrative retaining ring 30 is shown in FIG. 7. The retaining ring is generally flat and may include a slot 33 extending completely through it. To facilitate engagement with the fastener 10, the retaining ring is also provided with a pair of inwardly-projecting tabs 36. In accordance with the invention, the depths of the open-end splines 22 and the closed-end splines 25 are selected to accommodate the passage of the retaining ring tabs when the ring is being secured to the fastener 10. The crossover slots are shallower than the splines, such that the ring 30 must expand or flex outwardly to allow the ring tabs to slide from the open-end splines to the closed-end splines. Alternatively stated, the diameter 28a of the fastener, as taken across the bottom of the crossover slots 28, is greater than the inner diameter 30a of the retaining ring, as taken across the innermost edges 36a of the ring tabs 36. Thus, the tabs cannot be moved between the open-end and closed-end splines unless the retaining ring flexes outwardly. This flexing can be accommodated, for example, by expansion of the retaining ring slot 33, or by flexing of the ring so that the tabs project out of the ring's normal plane.

The retaining ring 30 is preferably, though not necessarily, made from a thin, flexible metal. Expansion or flexing of the ring is therefore unlikely unless the ring is deliberately forced with considerable effort. When the fastener 10 is in use with a retaining ring disposed with its tabs 36 engaging the closed-end splines 25, a force sufficiently high t expand the ring is seldom, if ever, encountered. Typically, the required force must be deliberately applied by an assembler directly manipulating the ring. Consequently, mere changes in the orientation of the ring with respect to the fastener are not likely to cause inadvertent release of the ring from the fastener. In addition, since only exterior splines and slots are used to secure the ring, the present invention is also suitable for use with hollow, internally-threaded fasteners, as discussed more fully below.

In a more detailed feature of the invention, the crossover slots 28 open into or join the open-end splines 22 at the ends of the splines nearest the head 16, while the slots open into the closed-end splines 25 at locations spaced from the splines' opposite ends. With this configuration, the retaining ring 30 may be more easily secured to the fastener, but less easily unsecured.

The fastener 10 is generally intended for non-retracting applications where the fastener head 16 does not move significantly from the panel. This situation is commonly encountered here only a small portion of the threaded surface of the fastener engages a complimentarily-threaded member, such as a conventional nut. As further shown in FIGS. 1-3, the open-end splines 22 are significantly longer than the closed-end splines 25. In addition, the crossover slots 28 are located much closer to the fastener head 16 than the fastener's opposite, tapered end 19.

Figure 6:
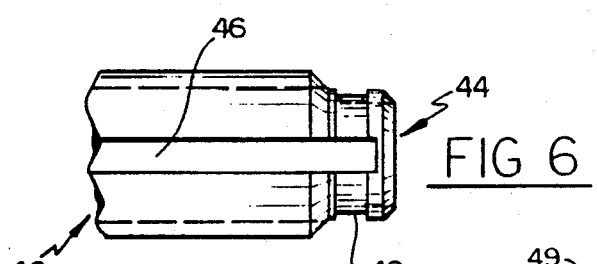
FIG. 6 is a side view of the fastener illustrated in FIGS. 4 and 5, taken from the top side of FIG. 4.
Figure 4:
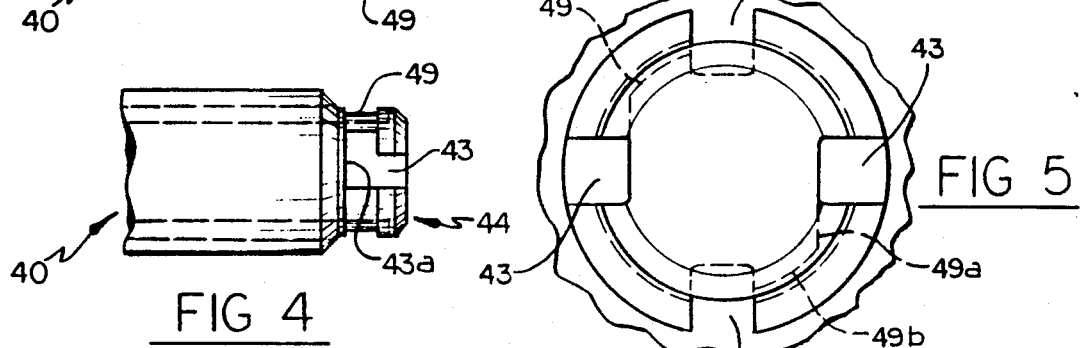
FIG. 4 is a side view of a second embodiment of a fastener in accordance with the present invention.
Figure 5:
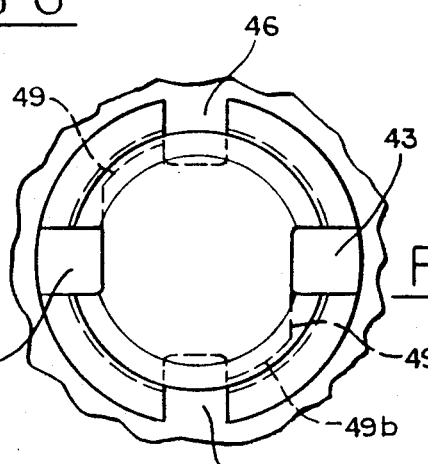
FIG. 5 is an end view of the fastener illustrated in FIG. 4, taken from the right side of FIG. 4.

FIGS. 4-6 illustrate a second embodiment of a fastener 40 in accordance with the invention. This fastener includes an elongated shaft with two open-end splines 43 extending longitudinally a short distance from the shaft's remote end 44 and with two closed-end splines 46 extending longitudinally a much longer distance alon the shaft, but terminating short of the shaft's remote end. Two crossover slots 49 connect together each open-end spline with a separate closed-end spline.

Unlike the fastener 10 of FIGS. 1-3, the fasener 40 of FIGS. 4-6 is intended for applications where a significant portion of the fastener body will threadingly engage another member and the fastener head (not shown) when retracted, will move a significant distance from the panel (not shown). Thus, the closed-end splines 46 of the fastener 40 extend a much greater length along the fastener shaft than do the closed-end splines 25 of the fastener 10. The open-end splines 43 are significantly shorter than the open-end splines 22 of the fastener 10. For ease of assembly, he crossover slots preferably open into the end 43a of the open-end splines 43. Smilarly, the crossover slots should preferably open into the closed-end splines at locations slightly spaced from the splines' opposite ends. This reduces the likelihood of an inadvertent transition of the retaining tabs 36 from the closed-end splines through the crossover slots to the open-end splines.

A further aspect of the present invention is more clearly illustrated in FIG. 5, where it can be seen that the bottom walls of the crossover slots 49 form a ramp having a greater depth adjacent the open-end splines 43 and a lesser depth adjacent the closed-end splines 46.

The ramp may be formed by a variety of cross-sectional shapes. Thus, as illustrated in FIG. 5, the ramp may be formed by a straight section or chord 49a intersecting a curved section 49b of constant depth. Alternatively, the ramp could be formed by a curved surface of continuously-varying depth, with a maximum depth adjacent the open-end splines and a minimum depth adjacent the closed-end splines. Preferably, the junctions between the crossover slots and the closed-end splines form a step or wall, as shown in FIG. 5.

The ramp configuration for the crossover slots 9 facilitates movement of the retaining ring tabs 36 in only one direction, from the open-end splines 43 to the closed-end splines 46. A greater effort is required to move the retaining ring tabs in the reverse direction, from the closed-end splines back to the open-end splines, because of the step transition between the slots and the closed-end splines.

Figure 8:
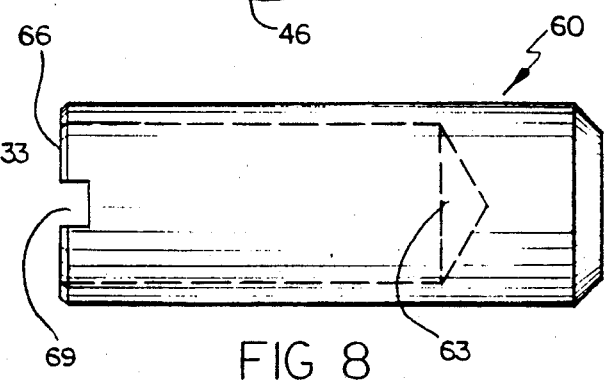
FIG. 8 is a side view of an insertion tool that can be used to secure the retaining ring of FIG. 7 to the fasteners of FIG. 1 or FIG. 4.

FIG. 8 depicts a retaining ring insertion tool 60 in accordance with the present invention. This insertion tool facilitates engagement of the retaining ring 30 with the fastener 40 and significantly eases the process of inserting the ring tabs 36 into the closed-end spines 46. The tool has a generally cylindrical shape, with a recess 63 at one of its ends 66 accommodating the fastener shaft. The tool end includes notches 69 configured to engage the retaining ring tabs 6. In addition, the tool wall is sufficiently thin to fit between the exterior surface of the fastener and an inner circumference 30b (see FIG. 7) of the retaining ring.

In use, a retaining ring 30 is attached to the end 66 of the tool 60 by sliding the tool within the ring's inner circumference 30b so that the notches 69 engage the ring tabs 36. The ring 30 may then be slid over a fstener such as the fastener 10 of FIGS. 1–3 (or the fastener 40 of FIGS. 4–6) by orienting the tool so that the ring tabs 36 slide into the fastener's open-end splines 22 (or 43). The tool is then slid longitudinally over the fastener until the ring tabs 36 meet the closed ends of the open-end splines adjacent the crossover slots 28 (or 49). Simple rotation of the larger and more easily handled tool then slides the ring tabs through the crossover slots and into the closed-end splines 25 (or 46). The tool, by engaging only the ring tabs 36, easily accommodates any expansion or outward flexing of the retaining ring necessary to pass the ring tabs through the crossover slots.

A third embodiment of a fastener 70 in accordance with the invention is illustrated in FIGS. 9 and 12. Unlike the fasteners 10 and 40 discussed above, the fastener 70 is hollow, with interior threads 76. The fastener's 70 external surface includes three longitudinally uniformly-spaced splines 79 that extend fully to the fastener's remote end 73. Three additional longitudinal splines 82, which have closed ends and do not extend to the fastener's remote end, are interleaved with the open-end splines 79. Shallow crossover slots 85 connect together each open-end spline 79 with a separate closed-end spline 82. The depth of the crossover slots again is selected such that a retaining ring 90 (FIG. 10) must expand or flex outwardly for its three inwardly-projecting tabs 93 to reverse from the open-end splines to the closed-end splines. Each crossover slot is also preferably, but not necessarily, positioned adjacent to the closed end 79a of its open-end spline 79, but a slight distance from the opposite ends of its closed-end spline 82. Accordingly, as discussed above in connection with the externally-threaded fasteners 10 and 40, the fastener 70 may be secured to a panel by a retaining ring in a manner that does not interfere with the fastener's internal threading and in a manner that does not require any specific relative orientation for the ring and the fastener to maintain their engagement.

To facilitate ease of retaining ring tabs 93 transition from the open-end splines 79 to the closed-end splines 82, the depth of the crossover slots 85 varies from a maximum depth adjacent to the open-end splines to a minimum depth adjacent to the closed-end splines. As illustrated in FIG. 2, the ramp shape at the bottom of the crossover slots may include two straight, or chordal sections 88 and 91. The first section 88 of each slot may be tangent with the bottom wall of the open-end splines, and the second section 91 may be spaced radially outwardly from the bottom wall of the closed-end spline.

Unlike the crossover slots 49 of the retracting-type fastener 40 illustrated in FIGS. 4–6, the crossover slots 85 of the fastener 70 connect with the closed-end splines 82 at an intermediate location along those splines. Bumps or berms 89 can be optionally provided in the bottom walls of the closed-end splines, at the ends of the splines nearest the fastener's remote end 73. These berms require the retaining ring to flex outwardly to allow the retaining ring tabs 93 to ride over them. In use, the berms provide the useful advantage of keeping the fastener 70 in a retracted position when the retaining ring is secured with respect to a panel and the fastener head 74 is pulled away from the panel.

The retaining ring 90 of FIG. 10 which can be used with the fastener 70 of FIG. 9, has a non-circular, hexagonal periphery 96. While a tool like the tool 60 of FIG. 8 would be suitable for inserting the ring 90 onto the fastener 70, an alternative tool 100 for accomplishing this insertion is depicted in FIG. 11 The tool includes a recess in one end having a surface that conforms with the retaining ring's hexagonal periphery. A correspondingly-shaped ledge (not shown) may, but need not necessarily, be provided inside the tool to support the ring. It will be appreciated that non-circular geometric shapes other than hexagons might alternatively be used.

In use, the retaining ring 90 is placed within the tool's hexagonal recess and the tool slid over the fastener's remote end 73 with the retaining ring tabs 93 engaging the open-end splines 79. As before, when the retaining ring tabs 93 reach the closed ends of the open-end splines, the tool is rotated to slide the tabs across the crossover slots 85 to the closed-end splines 82. Since the retaining ring 90 is depicted as being unslotted, in contrast with the retaining ring of FIG. 8, the tool 100 need accommodate only flexing of the ring and need not accommodate ring expansion.

It should be appreciated from the foregoing description that the present invention provides an improved fastener and retaining ring combination. A fastener in accordance with the present invention is suitable for application in either externally- or internally-threaded applications and is not dependent on the orientation between the fastener and the retaining ring to secure the ring in place.

It will, of course, be understood that modifications to the presently preferred embodiments will be apparent to those skilled in the relevant art. Accordingly, the scope of the present invention should not be limited to the particular embodiments discussed above, but should be defined only by the claims set forth below and equivalents thereof.

What is claimed is:

1. A fastener assembly comprising:
an elongated shaft having an exterior surface defining a first longitudinally-oriented spline extending to one end of the shaft and a second longitudinally-oriented spline terminated short of the end of the shaft and circumstantially spaced from the first spline;
a retaining ring having an inwardly-directed tab and adapted to slide onto the elongated shaft, with the tab projecting into the first spline; and
means defining a circumstantially-oriented crossover slot interconnecting the first and second splines, the slot having a depth less than the depth of the second spline and sized to require the retaining ring to expand or flex to permit transition of the ring tabs between the first spline and the second spline.

2. The fastener assembly of claim 1, and wherein the crossover slot forms a ramp having a greater depth adjacent the first spline than adjacent the second spline.

3. The fastener assembly of claim 1, and wherein the crossover slot forms a generally smooth ramp having a continuously-varying depth from a maximum adjacent the first spline to a minimum adjacent the second spline.

4. The fastener assembly of claim 1, and wherein the crossover slot opens into the first spline adjacent a closed end of said first spline and opens into the second spline at a location spaced from its two ends.

5. The fastener assembly of claim 1, and further comprising an elongated, generally cylindrical retaining ring insertion tool defining a recess for receiving the fastener shaft the tool further defining a notch at one end adapted to engage the retaining ring tab, the tool being sufficiently thin to fit within a region between the exterior surface of the shaft and an interior circumferential surface of the retaining ring.

6. The fastener assembly of claim 1, wherein:
the periphery of the retaining ring has non-circular, geometric shape; and
the fastener further includes an elongated retaining ring insertion tool having a recess in one end sized and shaped to conformably receive the retaining ring, to facilitate installation of the retaining ring on the shaft.

7. A fastener assembly comprising:
a retaining ring having an inwardly-directed tab; and
a shaft having an external surface defining a first spline extending along a length of the shaft with a closed end and an open end opening into one end of the fstener, the surface further defining a second spline circumstantially space from the first spline and having both ends closed, and the surface still further defining a crossover slot connecting the first spline with the second spline and having a depth less than the depth of the second spline, wherein a retaining ring may be disposed over the shaft by inserting the ring tab into the first open end spline and wherein rotation of the ring will cause the ring to expand or flex to allow the ring tab to move from the first spline to the second spline.

8. The fastener assembly of claim 7, and wherein the crossover slot forms a generally smooth ramp having a maximum depth adjacent the first spline and a minimum depth adjacent the second spline.

9. The fastener assembly of claim 7, and wherein the crossover slot opens into an end of the first spline and opens into the second spline at a location spaced from its two ends.

10. The fastener assembly of claim 7, and further comprising an elongated generally cylindrical retaining ring insertion tool defining a recess for receiving the fastener shaft, a first end of the tool having a sufficiently thin wall to fit within a region between the exterior surface of the shaft and an interior circumferential surface of the retaining ring, and the tool defining a notch adapted to engage the retaining ring tab.

11. The fastener assembly of claim 7, wherein:
the periphery of the retaining ring has non-circular, geometric shape; and
the fastener further includes an elongated retaining ring insertion tool having a recess in one end sized and shaped to conformably receive the retaining ring, to facilitate installation of the retaining ring on the shaft.

12. A fastener assembly comprising:
a shaft having a cylindrical external surface defining a first spline having a closed end and an open end at one end of the shaft, the surface further defining a second spline circumstantially spaced from the first spline and having both ends closed, and the surface still further defining a crossover slot connecting the first and second splines and having a depth less than the depth of the second spline;
a retaining ring sized to slide over the shaft and having an inwardly-directed tab engagable with the first and second splines and the crossover slot; and
a retaining ring insertion tool having a generally cylindrical shape and defining a recess in one end for receiving the shaft, the end of the tool having a thin wall sized to fit within a narrow region between the exterior surface of the shaft and an interior circumferential surface of the retaining ring, the end of the tool further including notches sized to engage the inwardly directed tab of the retaining ring, wherein rotation of the tool rotates the retaining ring to move the ring tab from the first spline to the second spline.

13. The fastener of claim 12, wherein the crossover slot forms a ramp having a greater depth adjacent the first spline than adjacent the second spline.

* * * * *

UNITED STATES PATENT AND TRADEMARK OFFICE
CERTIFICATE OF CORRECTION

PATENT NO. : 4,911,726
DATED : March 27, 1990
INVENTOR(S) : Roy L. Warkentin

It is certified that error appears in the above-identified patent and that said Letters Patent is hereby corrected as shown below:

In column 1, line 7, "rig" should be --ring--.
In column 2, line 12, "circumstantially" should be --circumferentially--.
In column 2, line 28, "obviate" should be --obviates--.
In column 2, line 33, "tee" should be --the--.
In column 3, line 4, after "invention" insert --.--.
In column 4, line 9, "t" should be --to--.
In column 4, line 42, "alon" should be --along--.
In column 5, line 11, "9" should be --49--.
In column 5, line 27, "6" should be --36--.
In column 5, line 34, "fstener" should be --fastener--.
In column 5, line 61, "reverse" should be --traverse--.
In column 6, line 10, "2" should be --12--.
In column 7, line 6, "circumstantially" should be --circumferentially--.
In column 7, line 11, "circumstantially" should be --circumferentially--.
In column 7, line 50, "circumstantially" should be --circumferentially--.
In column 7, line 49, "fstener" should be --fastener--.
In column 8, line 33, "circumstantially" should be --circumferentially--.

Signed and Sealed this

Sixteenth Day of July, 1991

Attest:

HARRY F. MANBECK, JR.

Attesting Officer    Commissioner of Patents and Trademarks